US010794531B2

(12) United States Patent
Murrow (10) Patent No.: US 10,794,531 B2
(45) Date of Patent: Oct. 6, 2020

(54) TRIPOD FOOT (71) Applicant: THE VITEC GROUP PLC, Richmond (GB)

(72) Inventor: Andrew Derek Murrow, Suffolk (GB)

(73) Assignee: The Vitec Group PLC, Richmond (GB)

(*) Notice: Subject to any disclaimer, the term of this patent is extended or adjusted under 35 U.S.C. 154(b) by 0 days.

(21) Appl. No.: 16/079,923

(22) PCT Filed: Mar. 20, 2017

(86) PCT No.: PCT/GB2017/050768
§ 371 (c)(1),
(2) Date: Aug. 24, 2018

(87) PCT Pub. No.: WO2017/174958
PCT Pub. Date: Oct. 12, 2017

(65) Prior Publication Data
US 2019/0049062 A1 Feb. 14, 2019

(30) Foreign Application Priority Data

Apr. 6, 2016 (GB) .................................. 1605836.4
May 11, 2016 (GB) .................................. 1608265.3
Feb. 6, 2017 (GB) .................................. 1701937.3

(51) Int. Cl.
F16M 11/36 (2006.01)
F16M 11/24 (2006.01)
G03B 17/56 (2006.01)

(52) U.S. Cl.
CPC ........... F16M 11/36 (2013.01); F16M 11/247 (2013.01); G03B 17/56 (2013.01);
(Continued)

(58) Field of Classification Search
CPC .. F16M 11/36; F16M 2200/08; F16M 11/247; F16M 11/245; F16M 11/041;
(Continued)

(56) References Cited

U.S. PATENT DOCUMENTS 1,486,508 A * 3/1924 Weeks ................. F16M 11/245
248/188.91
1,563,700 A * 12/1925 Frankenstein ............ E06C 7/46
182/111
(Continued)

FOREIGN PATENT DOCUMENTS

CN 201628065 U 11/2010
DE 2612409 A1 * 10/1977 ........... F16M 11/247
(Continued)

OTHER PUBLICATIONS

International Search Report dated Jun. 16, 2017.

Primary Examiner — Hiwot E Tefera
Assistant Examiner — Taylor L Morris
(74) Attorney, Agent, or Firm — Troutman Pepper Hamilton Sanders LLP (57) ABSTRACT A foot having a base portion and a handle, the handle being pivotally attached to the base portion at a first end and including a gripping portion at a second end, said handle further comprising a centrally deployed securing member attached to the gripping portion, the handle being movable between a first position in which the foot is removable from a leg and a second position in which an end of the securing member is secured within a securing recess in the leg portion whereby the foot is secured to the leg.

12 Claims, 8 Drawing Sheets (52) U.S. Cl.
CPC ....... *G03B 17/561* (2013.01); *F16M 2200/02* (2013.01); *F16M 2200/08* (2013.01)

(58) Field of Classification Search
CPC .. F16M 11/34; F16M 2200/027; F16M 11/16; F16M 13/00; B60P 7/0823; A47C 7/002; A47B 91/06; A47B 91/12; A47B 91/04; A47B 91/00; E06C 7/42; G03B 17/561; G03B 17/56
USPC .......... 248/188.8, 188.9, 500, 688, 677, 673
See application file for complete search history.

(56) References Cited

U.S. PATENT DOCUMENTS

| | | | | | |
|---|---|---|---|---|---|
| 1,679,461 | A | * | 8/1928 | Worsching | A47B 91/04 248/188.9 |
| 1,814,334 | A | | 7/1931 | Potigian | |
| 2,277,939 | A | * | 3/1942 | Thalhammer | E06C 7/46 248/188.9 |
| 2,736,130 | A | * | 2/1956 | Boiu | A47B 91/066 248/188.9 |
| 2,853,261 | A | * | 9/1958 | Loeb | A47G 23/0216 248/151 |
| 2,868,427 | A | * | 1/1959 | Hess | E06C 7/42 182/107 |
| 3,191,706 | A | * | 6/1965 | Petersen | B60V 3/08 180/125 |
| 3,603,547 | A | * | 9/1971 | Hills | A63G 9/00 248/188.2 |
| 4,379,541 | A | * | 4/1983 | Harkness | A47K 1/08 248/313 |
| 4,474,387 | A | * | 10/1984 | Maranell | B62H 1/00 248/188.9 |
| 4,852,836 | A | * | 8/1989 | Kawazoe | F16M 11/32 248/168 |
| 4,971,347 | A | * | 11/1990 | Cline | B62H 1/02 280/301 |
| 5,003,328 | A | * | 3/1991 | Gaynor | F16M 11/08 248/169 |
| 5,078,231 | A | * | 1/1992 | Davis | E06C 7/42 182/107 |
| 5,210,903 | A | * | 5/1993 | Horning | B60B 33/00 16/18 R |
| 5,351,981 | A | * | 10/1994 | Thomas | B62H 1/02 248/188.9 |
| 5,732,915 | A | * | 3/1998 | Heard | G09F 7/18 248/218.4 |
| 5,791,435 | A | * | 8/1998 | Garnett | E06C 7/46 182/107 |
| 6,021,984 | A | * | 2/2000 | Mills | F16M 11/14 248/219.4 |
| 6,340,166 | B1 | * | 1/2002 | Rethman | B62H 1/00 248/188.9 |
| 6,355,887 | B1 | * | 3/2002 | Gretz | F16L 3/233 174/135 |
| 6,389,655 | B2 | * | 5/2002 | Libecco | B60P 7/0823 24/129 R |
| 6,572,061 | B2 | * | 6/2003 | Overbeck | A47C 4/20 248/163.1 |
| 6,669,221 | B2 | * | 12/2003 | Leppke | B62H 1/02 248/188.9 |
| 6,910,246 | B2 | * | 6/2005 | Desmarais | A47B 91/066 16/42 R |
| 7,281,689 | B1 | * | 10/2007 | Johnston | F16L 3/13 248/49 |
| 7,401,850 | B2 | * | 7/2008 | Micheel | A47C 9/105 108/118 |
| 7,543,784 | B2 | * | 6/2009 | Lindsay | F16B 7/0433 248/168 |
| 7,621,550 | B1 | * | 11/2009 | Boruff | B62J 11/00 280/293 |
| 7,752,806 | B2 | * | 7/2010 | Krinner | A47G 33/1213 47/40.5 |
| 7,770,853 | B2 | * | 8/2010 | Shiffler | A47C 7/002 248/188.9 |
| 8,136,771 | B2 | * | 3/2012 | Cazalet | F16L 3/10 248/58 |
| 8,166,990 | B2 | * | 5/2012 | Daily | A45B 7/00 135/65 |
| 8,231,088 | B2 | * | 7/2012 | Lu | F16M 11/34 248/163.1 |
| 8,747,418 | B2 | * | 6/2014 | Qureshi | F16M 11/14 606/130 |
| 8,813,407 | B1 | * | 8/2014 | Sargent | F41A 23/16 42/94 |
| 8,998,164 | B2 | * | 4/2015 | Marquardt | A47B 91/06 248/188.9 |
| 9,554,639 | B1 | * | 1/2017 | Harden | F16M 11/041 |
| 9,615,662 | B1 | * | 4/2017 | Amber | F16B 2/08 |
| 9,810,023 | B2 | * | 11/2017 | Stewart | E06C 7/426 |
| 2004/0075031 | A1 | * | 4/2004 | Crain | F16B 7/1463 248/188.8 |
| 2004/0135042 | A1 | * | 7/2004 | Krinner | A47G 33/1213 248/158 |
| 2005/0045681 | A1 | * | 3/2005 | Hancock | B60R 11/0205 224/401 |
| 2006/0086871 | A1 | * | 4/2006 | Joseph | F16M 11/041 248/178.1 |
| 2006/0231702 | A1 | * | 10/2006 | Straus | A47B 91/06 248/188.9 |
| 2007/0290104 | A1 | | 12/2007 | Denison et al. | |
| 2008/0191106 | A1 | * | 8/2008 | Shiffler | A47B 91/06 248/188.9 |
| 2008/0283697 | A1 | * | 11/2008 | Darrow | B60R 11/02 248/163.1 |
| 2010/0050389 | A1 | * | 3/2010 | Robinson | A47B 91/06 16/42 R |
| 2011/0155886 | A1 | * | 6/2011 | Nakaniwa | F16M 11/36 248/440.1 |
| 2013/0085342 | A1 | * | 4/2013 | Stefanchik | A61B 90/50 600/232 |
| 2013/0105662 | A1 | * | 5/2013 | Cote | F16M 11/041 248/689 |
| 2013/0119213 | A1 | * | 5/2013 | Watson | E06C 7/42 248/201 |
| 2014/0252188 | A1 | * | 9/2014 | Webster | F16M 13/022 248/229.17 |
| 2014/0301730 | A1 | * | 10/2014 | Johnson | G03B 17/561 396/428 |
| 2017/0234480 | A1 | * | 8/2017 | Cedrone | A47G 33/12 248/511 |

FOREIGN PATENT DOCUMENTS

| | | | | |
|---|---|---|---|---|
| DE | 29613592 U1 | * | 9/1996 | ............ F16M 11/36 |
| WO | 200210635 A1 | | 2/2002 | |
| WO | 2008134698 A1 | | 11/2008 | |

* cited by examiner

TRIPOD FOOT

CROSS REFERENCE TO RELATED APPLICATIONS

This application is a national phase filing under 35 U.S.C. § 371 of International Patent Application No. PCT/GB2017/050768, filed Mar. 20, 2017, which claims priority to Great Britain Application No. 1605836.4 filed Apr. 6, 2016, Great Britain Application No. 1608265.3, filed May 11, 2016, and Great Britain Application No. 1701937.3 filed Feb. 6, 2017, each of which are incorporated herein by reference in their entirety.

FIELD OF THE INVENTION

The invention relates to a means of removable attachment of a foot to a leg of a support structure. The means is disclosed particularly for use in association with the leg of a tripod.

BACKGROUND TO THE INVENTION

Tripods are widely used as platforms for supporting, in a stable manner, equipment such as cameras for maintaining the stability of a camera during the camera's use. During such use the tripod may need to be transferred from one surface to another.

As such, tripods and other support equipment should ideally be able to accommodate different surface types to enable the tripod to function on differing terrain on which the equipment is to be used. Although a variety of solutions has been proposed, one solution is for the equipment to be designed to be attachable to different feet which are exchangeable and replaceable.

Amongst current approaches to address this problem is to include alternative foot types which can be attached, when required, onto a leg, for example on a spike at the end of a leg of the tripod, through use of a rubber strap. However, fitment and removal of straps currently in use requires a degree of force to work against the required resilience of the strap which is required to hold the foot firmly in place for safe operation.

Straps used currently can therefore be problematic in requiring a degree of force to be exerted by the user and therefore for the user to be able to properly grip the strap in order to clip the strap onto and off a tripod leg. It is not always possible in various outdoor conditions and outdoor circumstances for a user to have the sufficient strength and grip for the necessary force. This is particularly true when the strap is wet and/or the user's fingers are cold and so have little feeling or the user is wearing gloves. This can result in injury to the user particularly in outdoor or adverse weather conditions.

Embodiments of the current invention seek to address these problems.

SUMMARY OF THE INVENTION

In a broad, independent aspect, the invention provides a foot having a base portion and a handle, the handle being pivotally attached to the base portion at a first end and including a gripping portion at a second end, said handle further comprising a centrally deployed securing member attached to the gripping portion, the handle being movable between a first position in which the foot is removable from a leg and a second position in which an end of the securing member is secured within a securing recess in the leg portion whereby the foot is secured to the leg.

In essence, the centrally deployed securing member acts as an over-centre mechanism. Although such mechanisms have been known for many years, applying an over-centre mechanism to a tripod foot strap is unique and is particularly advantageous because the means of securing the foot to the leg facilitates fitment and removal of a foot to a leg in that the user needs to provide less force during this operation. The present inventors have realised that such application to a tripod foot results in a particularly advantageous mechanism compared to prior art mechanisms.

Preferably, the securing member is held within the securing recess by an over-centre latching action in the operation of the mechanism between the securing member and the securing recess.

The mode of operation typically incorporates a lever-type mechanism which considerably reduces the magnitude of the direct force exerted by a user on the securing member. Operation of the securing member and releasing the foot from the leg is made more comfortable for the user as well as safer due to there being less likelihood of losing grip and slipping. Additionally, the position of the handle provides a clear indication that the foot is in the secure position.

In some embodiments, the securing member is held within the securing recess by friction between the securing member and the securing recess. This configuration is advantageous because the frictional force is of sufficient strength to hold the foot firmly in place to the leg to prevent the leg from coming loose.

Preferably, the securing recess is substantially vertically orientated and in particular parallel to a main axis of the leg, to maximise the securing force. This configuration is particularly advantageous because it provides the maximum amount of friction to retain the member in position whilst the handle is upright so that the foot is securely attached to the leg. Further, this configuration can mean that the force which the user will apply to the handle is at a right angle to the axis of the handle rather than in-line with the handle which reduces the amount of grip required to prevent slippage, and which makes operation of the handle easier and more comfortable.

In some preferred embodiments, the securing member has a handle receiving recess for gripping the gripping portion of the handle. The configuration is advantageous because the engagement between the handle and the securing member enables the movement of the handle by a user operating the securing member. The receiving recess may be of a suitable shape for gripping the handle.

In some preferred embodiments, the securing member has a leg receiving recess for receiving an edge of the leg, the securing member being pivotable on the edge when the handle is in the first position. This configuration enables the securing member to be held in place (between the leg and the handle) when the foot is in the non-secured position.

In some embodiments, the securing member extends away from the gripping portion of the handle, in a direction distal to the end of the securing member which is secured in use to the securing recess. This configuration means that the securing member may be used as a lever by the user which makes operation of the handle easier. For example, the end of the securing member distal to securing recess may form a wedge shape.

In some embodiments, the securing member is pivotally attached within a securing member receiving aperture of the handle. This configuration is particularly advantageous because it provides symmetry and therefore ease and simplicity of use for the user.

Preferably, the gripping portion is ridged. This increases the ease of use for the user, enabling a better grip of the gripping member.

Preferably, the securing recess has a back wall and a front wall, wherein said front wall is of a height which is shorter than said back wall. The top part of the front wall is the upper edge onto which the securing member can pivot, in some preferred embodiments, as mentioned above. This configuration is particularly advantageous because the recess is thereby provided with a leading edge which can act as a lever fulcrum to engage the securing member to aid the insertion and removal of the securing member.

Preferably, the back wall of the securing recess is ridged. This configuration is particularly advantageous because it increases the level of friction which holds the securing member in place within the recess.

Preferably, the securing member is of a hard plastics material. This configuration is particularly advantageous because the securing member provided is thereby robust, durable and also relatively cheap to manufacture.

In some embodiments, the securing member is ridged. This configuration is particularly advantageous because it increases the level of friction able to hold the securing member in place within the recess.

Preferably, the handle is of a solid rubber material. This configuration is particularly advantageous because it is both a resilient material, provides good grip and is relatively cheap and straightforward to manufacture.

Preferably, the end of the securing member secured in use to the securing recess is curved in a concave manner (i.e. it has a curvature). This configuration is particularly advantageous because it increases the usability of the handle due to the curvature matching the curve of the outer face of the recess and allowing the pivoted member to be easily placed on the top of the recess.

Preferably, the front wall of the recess has an outer face which is curved in a convex manner which corresponds to the concave curve of said end of the securing member. This configuration is particularly advantageous because it allows the pivoted member to slide more easily away from the recess, as the foot is removed.

In some embodiments, said gripping portion has a substantially cylindrical gripping element. This configuration is particularly advantageous because a cylindrical shape allows the gripping element to be more easily gripped and utilised.

Preferably, the handle is pivotally connected to the foot by two opposed pivot mounts. This configuration is particularly advantageous because it allows for an increase in strength and provides symmetrical distribution of forces within the handle during operation. The two pivoting arms of the handle also shield the securing member, reducing the chance of it catching on other items during operation or when in transit.

Advantageously, the foot includes a leg receiving recess, enabling the end of a leg to be seated within the recess to provide a housing for a leg as the foot is secured thereto.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Tripods and other support equipment should ideally be able to accommodate different surface types dependent upon the terrain on which the tripod is to be used. For example, when the tripod is to be used on soft ground, then the base of a leg can be equipped with a small spike which can penetrate the ground and impart thereby stability to the tripod. Such a spike would however, be unsuitable for use on a hard surface such as tiles or floor boards as the frictional force between the end of the spike and the surface would be low, leaving the tripod leg too easily moveable horizontally. A spike may also damage the surface which may not be acceptable.

Figure 1:
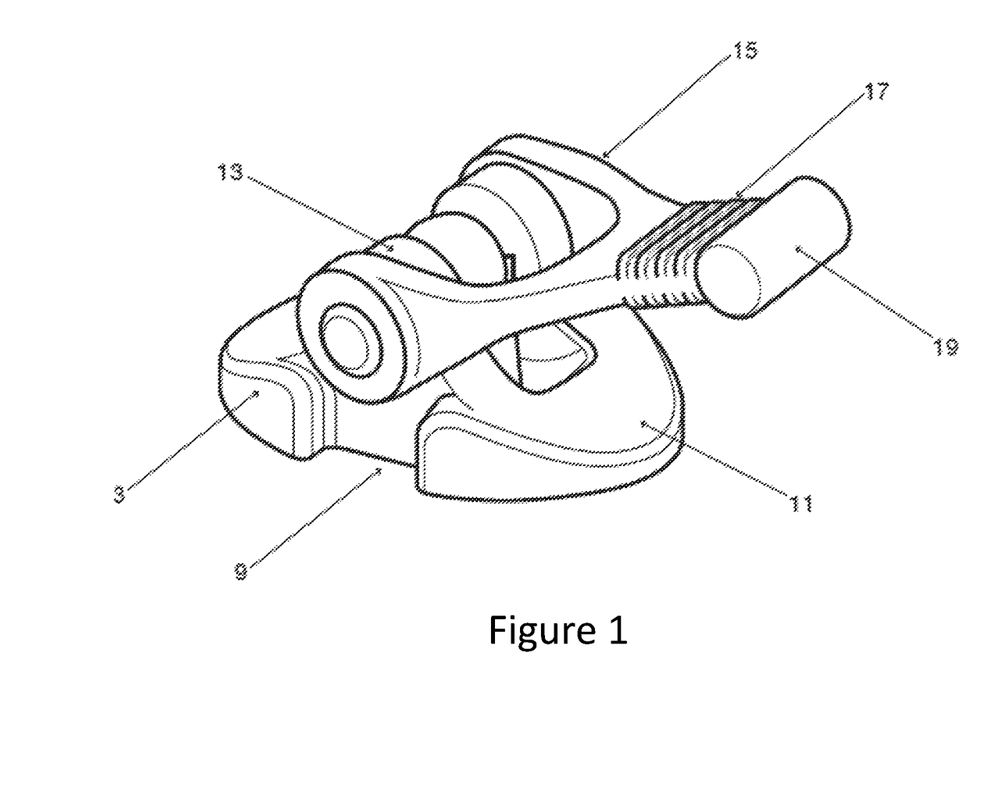
FIG. 1 is a perspective view showing a prior art foot and fitment means therefor.

To solve this problem, many different methods have been proposed. The present invention is concerned with one particular solution, namely enabling the tripod and other equipment to be attachable to different feet which are exchangeable and replaceable. Current approaches include alternative foot types being clipped onto the end of the leg of a tripod by way of a rubber strap which requires a degree of force in order to fit and remove the strap. Sufficient strength and grip is not always possible in various conditions and circumstances, particularly operating outdoors. FIG. 1 shows an embodiment of this prior art. Embodiments of the current invention seek to address these problems.

Figure 2:
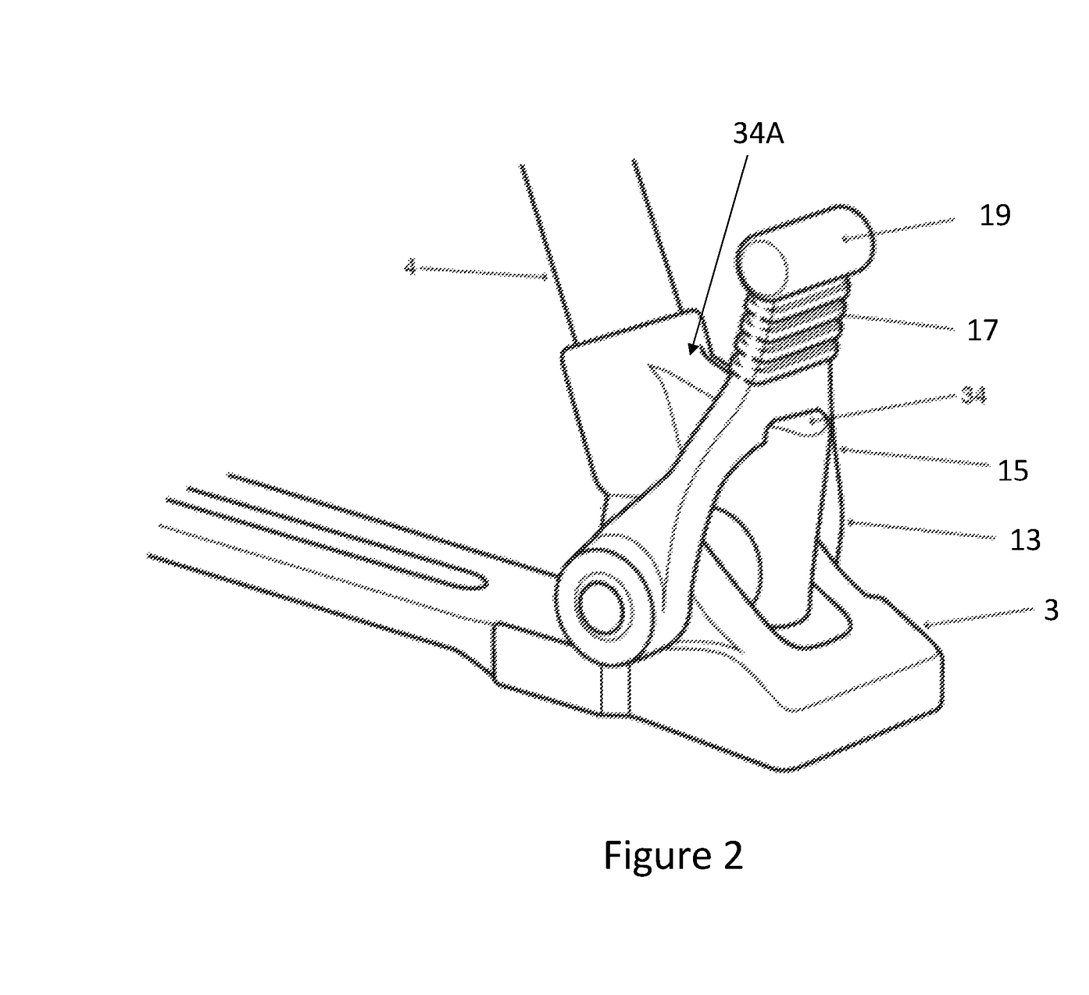
FIG. 2 is a close-up view of a prior art foot as shown in FIG. 1 in the secured position.

In the prior art, as shown in FIGS. 1 and 2, there is shown a foot 3 with a flat base 9 and curved upper surface 11. Mounted on the upper surface 11 is an axle mount 13 to which a handle 15 is pivotally attached at two separate points. The handle 15 is formed of a rubber material and includes a ridged gripping portion 17 and a cylindrical gripping element 19 at the end of the handle 17.

In use, the handle 15 needs to be lifted by the user and forced over a ledge 34 shown in FIG. 2 to enter a recess 34A within the leg of a tripod. The user will here pull the handle gripping portions 17 and 19 against the resilience of the material from which the handle 15 is formed, which resilience subsequently acts to retain the foot 3 in place. The same pulling action is required to remove the handle 15 from the secured position.

Figure 3:
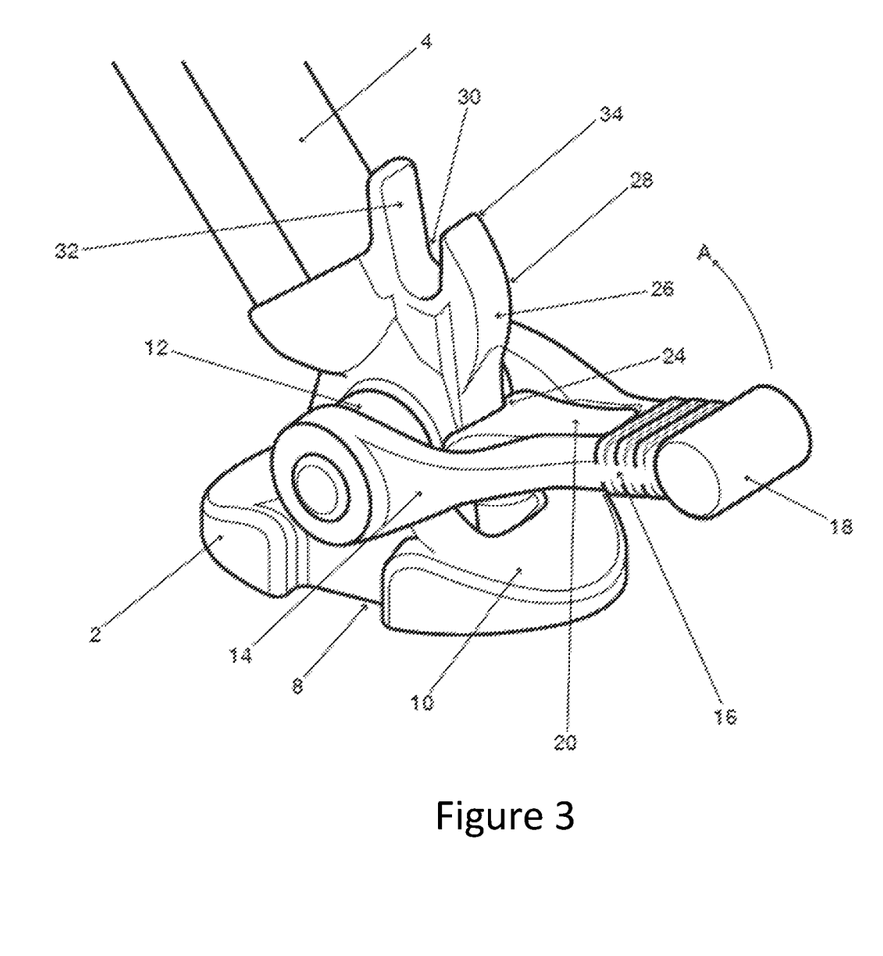
FIG. 3 is a perspective view of an embodiment of a foot according to the invention.

Referring therefore to the remaining figures, and initially to FIG. 3, here is shown an embodiment of the invention whereby a foot 2 is attached to a leg 4 by a securing assembly. The foot here is shown in the releasable, non-secured state. The foot has a flat base 8 to provide good contact with the surface on which the tripod stands and an outwardly curved upper part 10. Mounted on the upper surface 10 of the foot 2 is an axle mount 12 to which a handle 14 is pivotally attached. The handle 14 is attached to the foot 2 at two separate points on opposed sides of the leg 4. The handle 14 incorporates a ridged gripping portion 16 with a cylindrical gripping element 18 at the end. It is envisaged that the handle is made of any suitable solid rubber material.

A pivotable securing member (or tang) 20 is attached by means of a pivot mount to the handle 14. In this example, the securing member 20 is attached to the handle 14 within a central recess 22 within the handle 14, to give the maximum support and to provide symmetry which is of advantage in force distribution and provides an even application of force and even wear on the handle and other components. It is envisaged that the securing member 20 is made of a suitable hard plastics material. The free end 24 of the securing member 20 rests, when not in use, on an outer face 26 of the front wall 28 of a substantially vertically orientated recess 30 upon the leg 4.

Preferably, the recess 30 has a back wall 32 having a greater height than the front wall 28. Preferably, the free end 24 of the securing member 20 is inwardly arched. The arch matches the outwardly curved face of the outer face 26 of the front wall 28 of the recess 30 and aids removal of the securing member to release the foot 2.

In use, when the handle 14 is in the position shown in FIG. 3, the foot 2 is not firmly secured to the leg 4, which is merely resting upon an axle mount 12, between the pivot points and the leg 4 can therefore be easily moved away from the foot 2 and vice versa.

Figure 4:
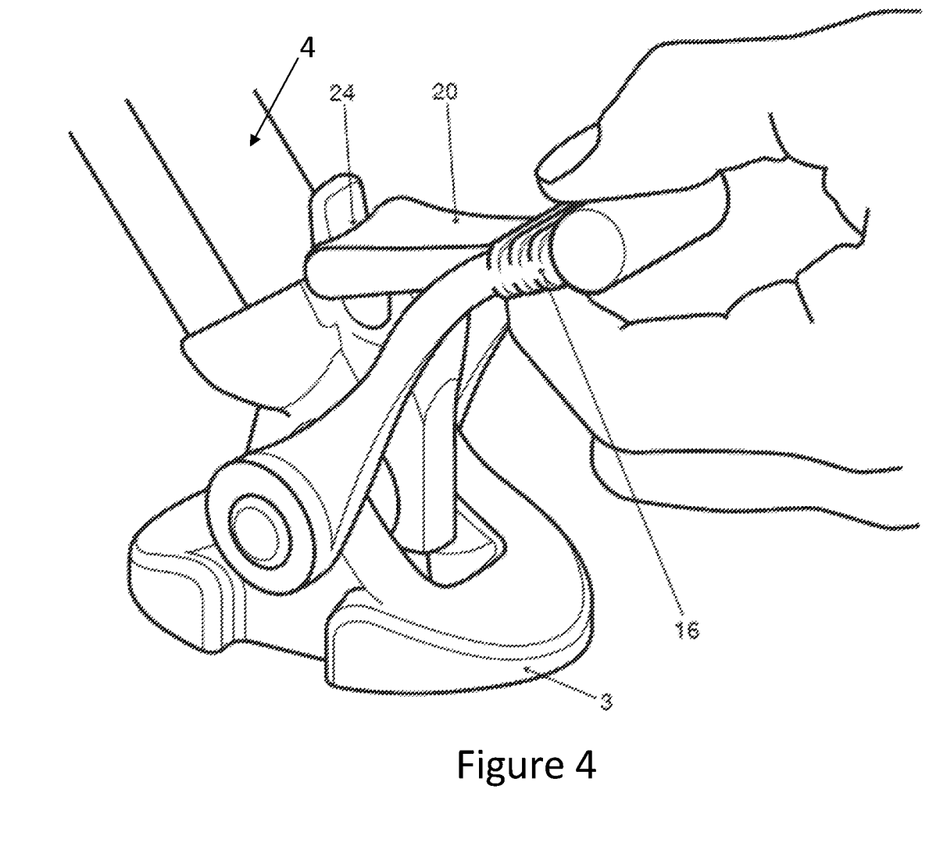
FIG. 4 is a perspective view of the embodiment of the foot of FIG. 3 during the securing operation.

The end of the leg 4 is profiled to conform to the axle mount 12 and has an arched conformation to fit about in contiguous relationship with said axle mount 12. In order to secure the foot 2 firmly to the leg 4, the securing member 20 is raised as shown in FIG. 4 such that the lower surface of the securing member 20 rests on the upper edge 34 of the front wall 28 of the securing recess 30. The handle 14 is then moved in the upwards direction as indicated by the arrow A, which lifts the securing member (or tang) 20 and in particular the pivoted end 24 of the securing member, similarly upwards.

In carrying out this action, the contact between the securing member 20 and the edge 34 of the front wall 28 acts as a fulcrum for the motion of the handle 14 and the mechanical advantage gained thereby assists the user in moving the securing member 20 from the rest position to the securing position. Motion of the securing member 20 continues until the securing position is reached in which the handle 14 is substantially vertically orientated and perpendicular to its initial position. This position is shown in FIG. 5.

Although this movement from the initial position of the handle 14 to where the securing member 20 is fully inserted within the recess 30, does require a degree of upwards force by the user, the level of force is reduced over that required in the prior art by the engagement of the outer wall 28 of the recess 30 with the securing member 20 which thus acts as a lever aiding the user in the upwards motion. A turning force is therefore engaged rather than the stretch force required by the prior art. This mode of operation is also not reliant on maintaining elasticity of the handle 14.

Figure 5:
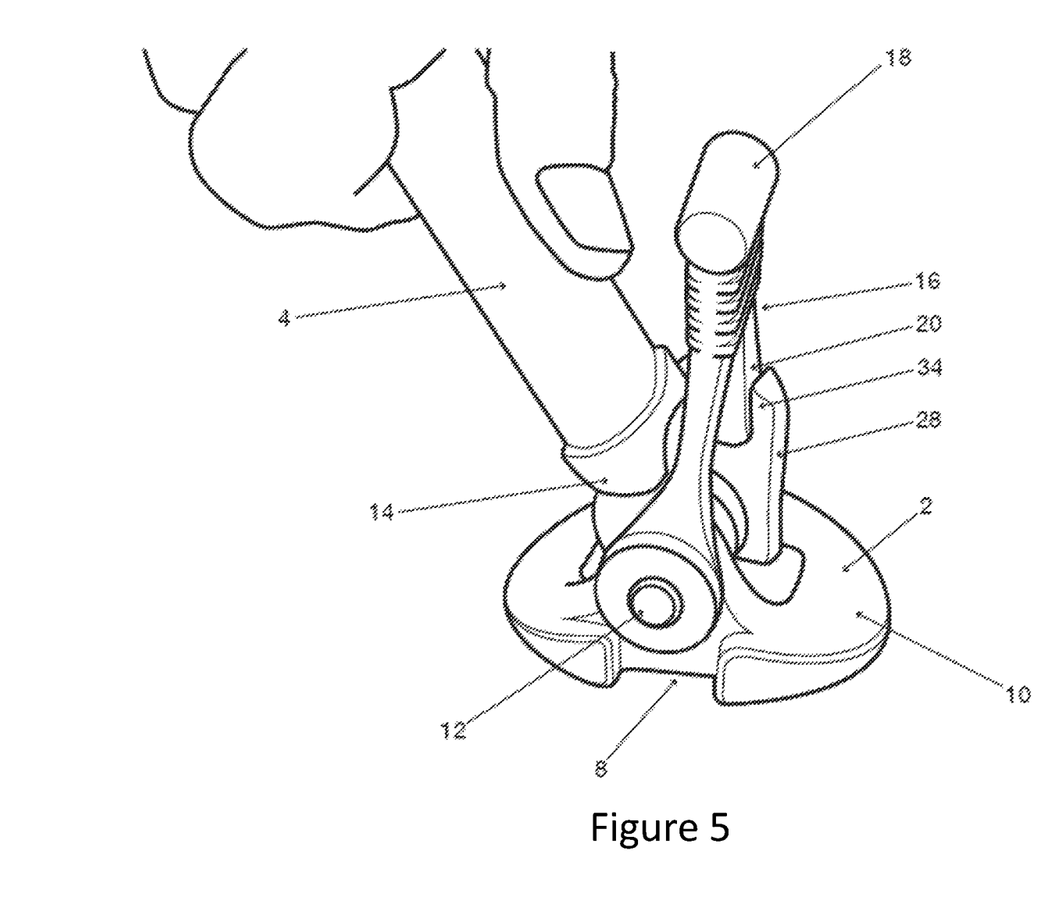
FIG. 5 is a perspective view of the first embodiment of the foot of FIG. 2 in the secured position.

FIG. 5 shows an embodiment in which the foot 3 is in the secure state of attachment to the leg 4. The securing member 20 can be seen to be inserted fully into the recess 30 and handle 14 can be seen extending upwardly clearly to provide a clear indication that the foot 4 and leg 2 are attached securely.

When in the securing position, the securing member 20 is held in position against accidental movement, by the resilience of the handle 14 and frictional forces which act to oppose movement of the securing member 20 along the recess to the release position. This is aided by ridges in the back wall 32 of the recess 30. In order for the securing member 20 to exit the recess, then as the securing member 20 moves, the end of the securing member 20 engages the rear surface 32 of the recess 20. The frictional force thereby generated due to the movement is enhanced by the pivoting engagement between the securing member 20 and the upper edge 34 of the front wall 28 which acts to force the end of the securing member 20 against the rear surface 32, so increasing the frictional force resisting movement.

In order to release the foot 2 from the leg 4 therefore, the user grips the handle 14 and moves this in the opposite direction to the direction A used to secure the foot 2 to the leg 4 shown in FIG. 4. The lever action of the handle 14 acting about the aforementioned fulcrum enables the securing member 20 to be removed from the recess 30, with relative ease, but only when required.

Preferably, the recess 30 is formed through provision of an upwardly extending front wall 28 and upwardly extending back wall 32. The front wall 28 has a height which is shorter than the back wall 32 and has a curved outer face. Both the inner faces of the front wall and back wall of the recess 30 are substantially flat, joining together at a convexly curved base. In an embodiment, the back wall 32 may have grooves or ridges to increase the level of friction. In use, for the foot 2 to be deployed back to a non-secured state, the handle 14 is moved in the downwards direction by the user which acts to pull the securing member 20 upwards out of the recess 30 and then released back to the position in FIG. 2.

Figure 6:
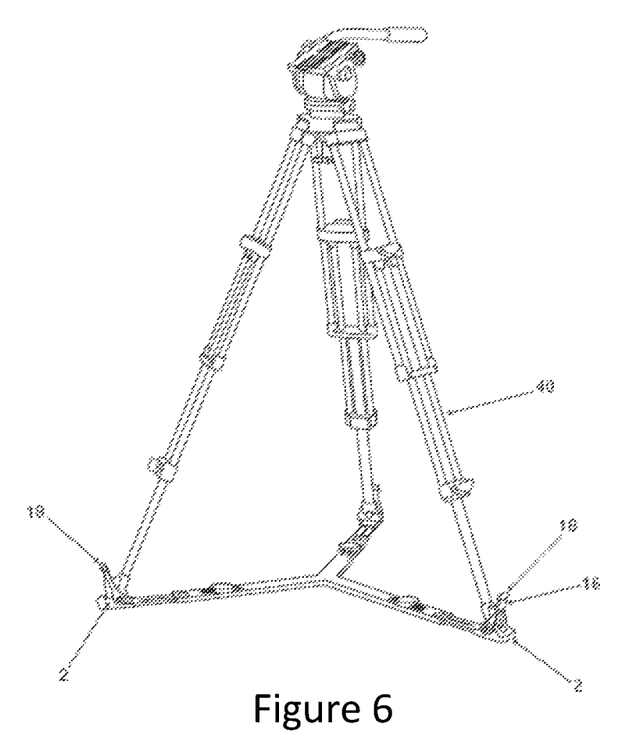
FIG. 6 is a perspective view of a tripod incorporating feet on each leg, the feet as shown in FIG. 2.

FIG. 6 shows an example of the invention in use, whereby feet 2 are secured to the legs 4 of a tripod 40.

In an optional embodiment, the gripping portion 16 consists of a horizontally attached gripping element 18 which is cylindrical in shape, however in alternative embodiments this gripping portion is suitably sized and shaped to enable a user to grip. For instance, in alternative embodiments there are finger indentations or an arched cylinder.

In alternative embodiments the handle 14 can be attached to the foot 2 at just one pivot point. In a further alternative embodiment the gripping element 18 can include grooves, indentations or any suitable gripping material or texture. In a further alternative embodiment the gripping element 18 can be any suitable design to enhance the gripping ability.

The description also envisages that the foot 2 described may be used in combination with different foot designs to accommodate different surface types.

Additionally, the foot 2 described can be used on any leg 4 which requires exchangeable and removable feet including, but not limited to, tripods, monopods, easels, parasols and garden furniture.

In additional alternative embodiments, the leg 4 of the tripod is not necessarily sitting upon an axle mount 12 on the foot 2 but the foot includes a leg receiving recess enabling a leg to rest in the receiving recess allowing the foot to provide a housing for a leg as the foot is secured thereto. A foot can therefore be usable for different legs.

A further alternative embodiment is envisaged wherein the recess 30 is horizontally orientated.

In addition, alternative embodiments are envisaged whereby the entire securing assembly 6 and recess 30 is separable from both the foot 2 and the leg 4 of a tripod 40. Alternatively, the recess 30 may be an attached part of the foot but is separable from the leg 4 of the tripod 40.

Examples of a further embodiment of the invention will now be described with reference to FIGS. 7 to 12.

Figures 7, 8, 9A:
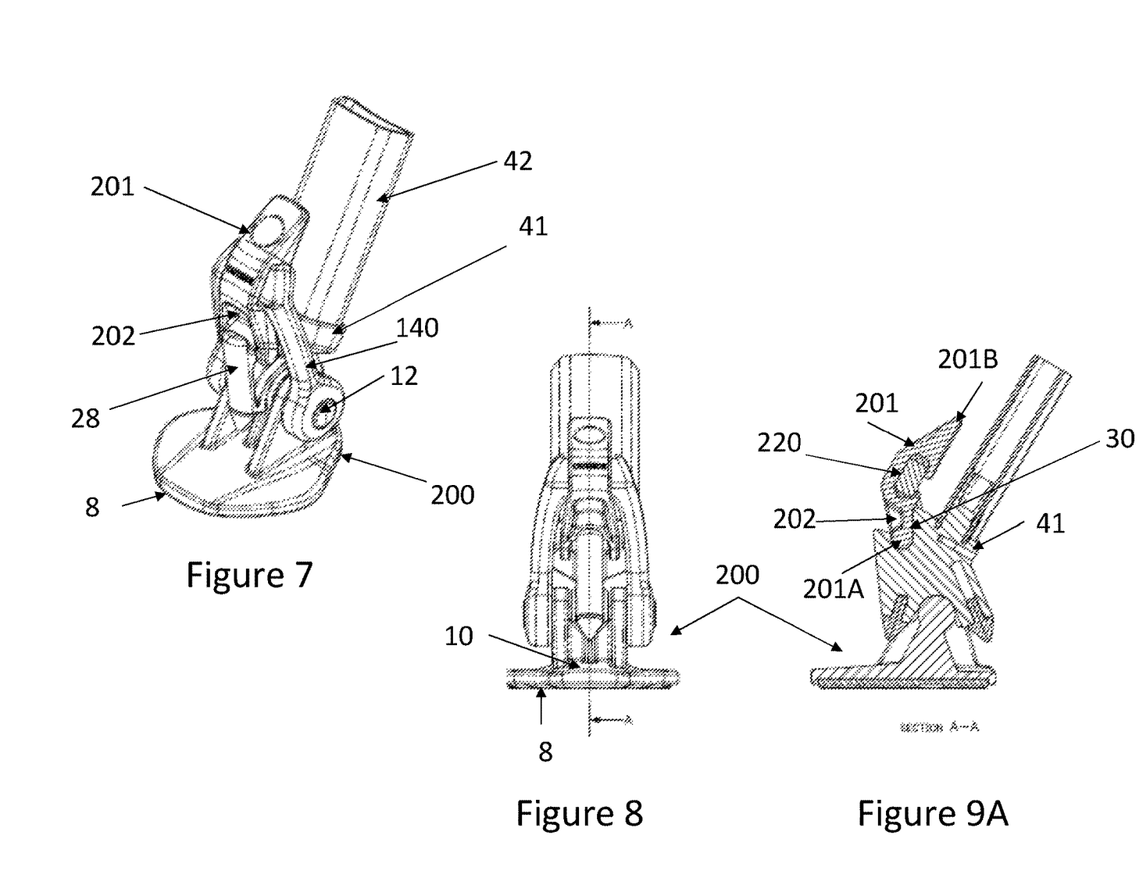
FIG. 7 is a perspective view of another embodiment of a foot according to the invention, attached to a tripod leg in a secured position.
FIG. 8 is a frontal view of an embodiment of the foot of FIG. 7.
FIG. 9A is a sectional, side view of an embodiment of the foot of FIG. 7.

Referring first to FIGS. 7 and 8, a foot 200 is attached by a securing assembly to a leg 42. The foot 200 shown in FIG. 7 is shown in a secured state. The foot 200 has a flat base 8 to provide good contact with the surface on which the tripod stands and an outwardly curved upper part 10. Mounted on the upper surface of the foot 200 is an axle mount 12 to which a handle 140 is pivotally attached. The handle 140 is made of a suitable solid rubber material, as in the above described embodiments.

Figure 9B:
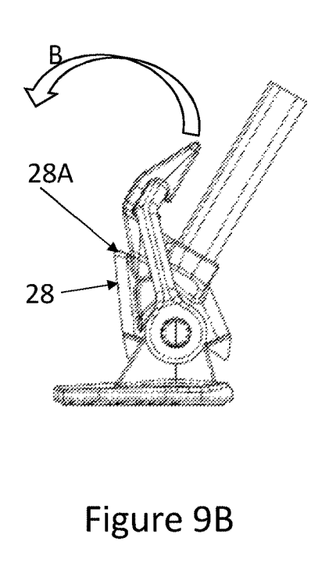
FIG. 9B is a side view of an embodiment of the foot of FIG. 7.

A securing member 201 is attached to the handle 140. As can be seen in FIGS. 9A and 9B, the central portion of the handle 140 which formed the gripping portion in the first embodiment is attached to the securing member 201. The gripping portion of the handle 140 is gripped within a central recess 220 within the securing member 201 which is shaped appropriately to grip and retain the handle 140. The gripping portion is substantially a parallelepiped to enable gripping by the central recess whose shape matches the shape of the gripping portion. The central positioning is advantageous as it provides symmetry and thus even application of securing forces, with an even wear of the handle and other component. The securing member 201 is preferably made of a suitable hard plastics material.

The securing member 201 has a side recess 202 on a side of the securing member which is opposite to that of central recess 220 which engages with the handle, as can be seen for example in FIG. 9A. The securing member 201 has two ends, 201A and 201B. The end 201A which is closer to the side recess 202 of the securing member 201 engages with a substantially vertically orientated recess 30 of the leg 41. Accordingly, embodiments of FIGS. 7 to 12 differ from the examples of FIGS. 2 to 6 particularly in that the securing member 201 has two free ends (instead of one as securing member 20) and two recesses (securing member 20 has none). The upper end 201B of the securing member 201 may be used as a lever to enable the user to release the securing assembly and the recesses of the securing member 201 itself enable engagement with the handle and leg 41. It will be appreciated that possible modifications mentioned above in respect of the examples of FIGS. 2 to 6 also apply to the examples of FIGS. 7 to 12.

In a preferred embodiment, the recess 30 of the leg portion 40 has a back wall 32 having a greater height than the front wall 28. Preferably, end 201A of the securing member 201 is inwardly arched and the arch matches the curvature of the recess 30. The recess 30 substantially matches the locus of movement of the end 201A of the securing member 201 during operation.

The upper end of the front wall 28A fits within the side recess 202 when the securing assembly is in the non-secured state. In the non-secured state the securing member 201 rests on the upper end of the front wall 28A, being held between the upper end of the front wall 28A and the handle 140. The engagement of the upper end of the front wall 28A with the side recess 202 enables the securing member to be held in place between the upper end of the front wall 28A (edge) and the handle 140.

The end of the leg 41 is profiled to conform to the axle mount 12 and has an arched conformation to fit about in contiguous relationship with said axle mount 12. To reach a non-secured state, the upper end 201B of the securing member is moved in the downwards direction as indicated by the arrow B, which rotates the securing member 201 and in particular the pivoted end 201A of the securing member 201. This rotation of the securing member 201 rotates the handle 140 in the same direction, and also initially stretches the handle 140 due to the different locations of the pivot point 201A for the securing member and 12 for the handle. A user may rotate the upper end 201B in the direction of the arrow to enable pivoting of the end 201A within the recess 30 and movement of the handle 140. Advantageously, the shape of the securing member 201 enables the user to carry out the release movement by pressing with the thumb onto the upper end 201B of the securing member.

In carrying out this action, the contact between the pivoted end 201A of the securing member 201 and the recess 30 acts as a first fulcrum for the motion of the handle 140. Further, in continuing to carry out this action, the contact between the side recess 202 of the securing member 201 and the edge 28A of the front wall 28 acts as a second fulcrum for the motion of the securing member 201. The mechanical advantage gained thereby assists the user in moving the securing member 20 from the rest position to the securing position.

In the securing position, the handle 140 is substantially vertically orientated. Motion of the securing member 201 continues until the non-securing position is reached, and the handle is at an angle from the vertical. In use, when the handle 140 is in the non-secured position, the foot 200 is not firmly secured to the leg 41, which is merely resting upon the axle mount 12 and the leg 41 can therefore be easily moved away from the foot 2 and vice versa.

Figure 10:
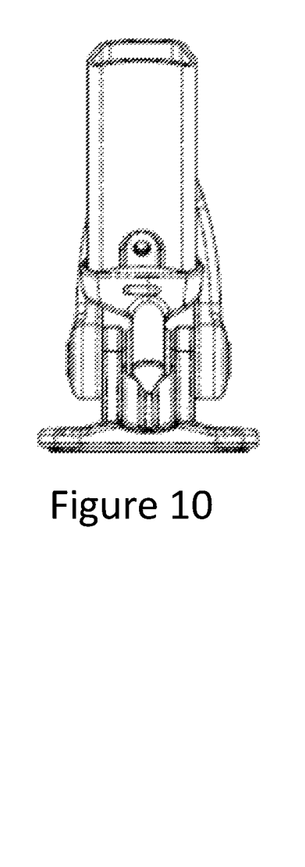
FIG. 10 is a back view of an embodiment of the foot of FIG. 7.
Figure 11:
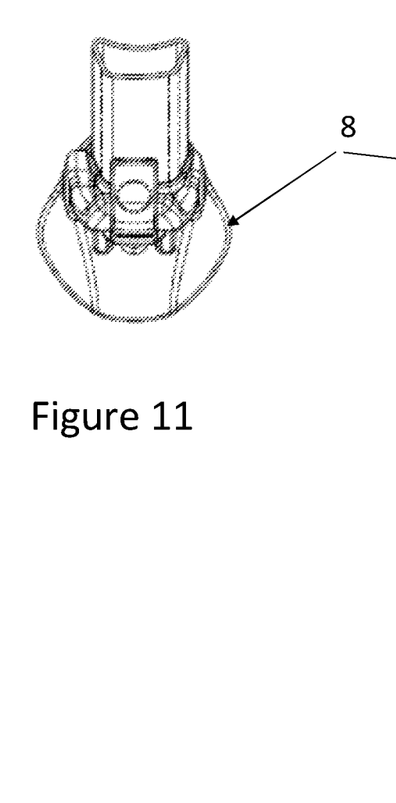
FIG. 11 is another perspective view from above of an embodiment of the foot of FIG. 7.
Figure 12:
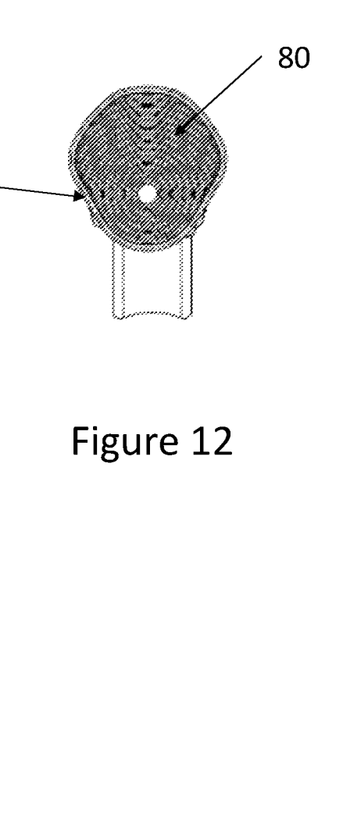
FIG. 12 is a view from the bottom of an embodiment of the foot of FIG. 7.

FIG. 10 is a back view of an embodiment of the foot of FIG. 7 and FIG. 11 is a top perspective view of an embodiment of the foot of FIG. 7. FIG. 12 is a view from the bottom of an embodiment of the foot of FIG. 7 which shows the flat base 8 having a profiled portion (preferably made of rubber) to provide good grip to the surface onto which the leg is positioned.

Modifications can be made to the described and illustrated embodiments whilst remaining within the scope of the invention.

The invention claimed is:

1. A leg with a foot, the foot having a base portion, a stretchable handle made from a resilient material, and a rigid, securing member centrally deployed with respect to the handle, the handle being pivotally attached to the base portion at a first end and including a gripping portion at a second end, the gripping portion shaped for a person to grip between their finger and thumb, the handle being movable between a first position in which the foot is removable from the leg and a second position in which an end of the securing member closest to the base portion is secured within a securing recess in a leg portion whereby the foot is secured to the leg, wherein the securing member has a leg receiving recess for receiving an edge of the leg, the securing member pivotable on the edge when the handle is in the first position, wherein the securing member extends away from the gripping portion of the handle and is attached within a securing member receiving aperture of the handle, in a direction distal to the end of the securing member which is secured in use to the securing recess.

2. The leg according to claim 1 wherein, in use, the securing recess is substantially vertically orientated.

3. The leg according claim 1, wherein the securing member is held within the securing recess by an over-centre latching action during an operation of the mechanism between the securing member and the securing recess.

4. The leg according to claim 1, wherein the securing member has a handle receiving recess for gripping the gripping portion of the handle.

5. The leg according to claim 1 wherein the securing member is pivotally attached within the securing member receiving aperture of the handle.

6. The leg according to claim 1 wherein said gripping portion is ridged.

7. The leg according to claim 1 wherein the securing recess has a back wall and a front wall and wherein said front wall is of a height which is shorter than said back wall.

8. The leg according to claim 1 wherein the securing member is of a hard plastic material.

9. The leg according to claim 1 wherein the handle is of a solid rubber material.

10. The leg according to claim 1 wherein the end of the securing member secured in use to the securing recess is curved in a concave manner.

11. The leg according to claim 10, wherein a front wall of the securing recess has an outer face which is curved in a convex manner which corresponds to a curve of said end of the securing member.

12. A tripod support stand incorporating a leg according to claim 1.

* * * * *